United States Patent [19]

Williamson et al.

[11] Patent Number: 5,443,724
[45] Date of Patent: Aug. 22, 1995

[54] APPARATUS FOR SEPARATING THE COMPONENTS OF A LIQUID/LIQUID MIXTURE

[75] Inventors: Kenneth M. Williamson, Jamesville; Scott A. Whitney, Marathon; Alan R. Rausch, Cortland; Thomas C. Welch, Jr., Homer, all of N.Y.

[73] Assignee: Pall Corporation, East Hills, N.Y.

[21] Appl. No.: 38,231

[22] Filed: Mar. 29, 1993

Related U.S. Application Data

[63] Continuation-in-part of Ser. No. 996,128, Dec. 23, 1992, abandoned.

[51] Int. Cl.$^6$ .............. B01D 36/00; B01D 36/02
[52] U.S. Cl. .............. 210/323.2; 210/295; 210/296; 210/314; 210/316; 210/416.4; 210/488; 210/489; 210/492; 210/DIG. 5
[58] Field of Search .............. 210/416.4, 435, 323.2, 210/488, 295, 502.1, 300, 489, 314, 492, 296, 503, 505, DIG. 5, 316; 428/272, 421, 422

[56] References Cited

U.S. PATENT DOCUMENTS

| | | | |
|---|---|---|---|
| 2,872,043 | 2/1959 | Fitzgerald et al. | 210/DIG. 5 |
| 2,929,503 | 3/1960 | Ambruster, II et al. | 210/DIG. 5 |
| 3,144,407 | 8/1964 | Olmos | 210/DIG. 5 |
| 3,268,442 | 8/1966 | Pall et al. | |
| 4,050,237 | 9/1977 | Pall et al. | 55/486 |
| 4,231,768 | 11/1980 | Seibert et al. | 55/487 |
| 4,320,005 | 3/1982 | DeGraffenreid | 210/232 |
| 4,372,847 | 2/1983 | Lewis | 210/86 |
| 4,419,234 | 12/1983 | Miller et al. | 210/232 |
| 4,437,986 | 3/1984 | Hutchins et al. | 210/130 |
| 4,493,772 | 1/1985 | Tanaka | 210/799 |
| 4,565,629 | 1/1986 | Wilson et al. | 210/248 |
| 4,588,500 | 5/1986 | Sprenger et al. | 210/100 |
| 4,594,202 | 6/1986 | Pall et al. | 264/8 |
| 4,663,222 | 5/1987 | Ohue et al. | 428/224 |
| 4,676,807 | 6/1987 | Miller et al. | 55/487 |
| 4,707,269 | 11/1987 | Ohue et al. | 210/651 |
| 4,716,074 | 12/1987 | Hurley et al. | 428/220 |
| 4,726,901 | 2/1988 | Pall et al. | 210/496 |
| 4,759,782 | 7/1988 | Miller et al. | 55/487 |
| 4,871,455 | 10/1989 | Terhune et al. | 210/232 |
| 4,892,667 | 1/1990 | Parker et al. | 210/799 |

FOREIGN PATENT DOCUMENTS 1576179  7/1990  U.S.S.R. .............. 210/DIG. 5

OTHER PUBLICATIONS

"Simulation of Non-Woven Fibre Mats and the Application to Coalescers"; M. S. Abdel-Ghani and G. A. Davies, Chem. Eng. Sci. vol. 40, No. 1; pp. 117-129 (1985).

*Primary Examiner*—John Kim
*Attorney, Agent, or Firm*—Leydig, Voit & Mayer

[57] ABSTRACT

A liquid purification system is provided which is capable of separating a first liquid, that is wholly or partly immiscible in and forms a discontinuous phase with a second, continuous phase-forming liquid, from the second liquid, which includes at least one coalescing element or assembly for coalescing the first liquid having at least one fluid inlet at the top thereof; and at least one separating element or assembly for separating droplets of the first liquid from the second liquid, the at least one coalescing element or assembly being arranged in superposed and fluid communicable relationship above the at least one separating element or assembly

22 Claims, 6 Drawing Sheets

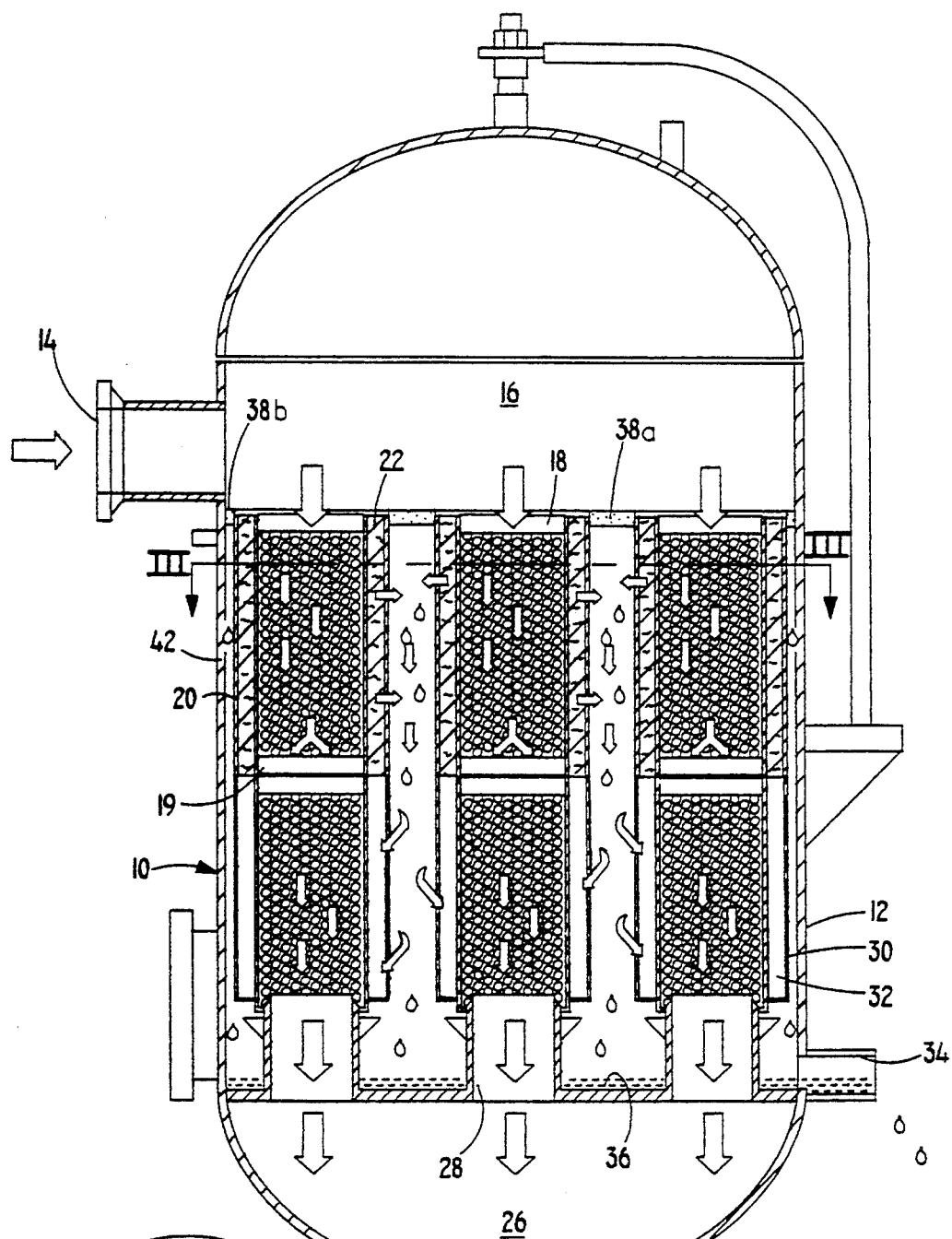
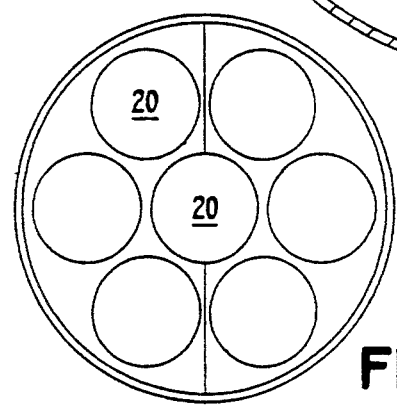
FIG. 3a
FIG. 3b

APPARATUS FOR SEPARATING THE COMPONENTS OF A LIQUID/LIQUID MIXTURE

This application is a continuation-in-part of application Ser. No. 07/996,128, filed Dec. 23, 1992, now abandoned.

TECHNICAL FIELD

The present invention is directed to a method of separating small amounts of a first liquid which are immiscible but suspended in a second liquid and to a system used therefor. More particularly, the present invention is directed to a method of separating and removing a discontinuous liquid phase from a continuous liquid phase and to a coalescing/separating system used therefor.

BACKGROUND OF THE INVENTION

Many industrial processes and apparatus, as well as household devices, relate to the separation of a liquid phase from another phase. In some instances, particularly when water is the phase present in minor amounts, chemical means may be used to remove the water from the other components. Such means for removing moisture, however, require the replacement and/or regeneration of the reagents used in the process. The reagents employed and the products formed frequently introduce complications relating to handling and disposal. Because of the concomitant cost and, in some instances, inconvenience associated with such processes, physical methods and apparatus have been preferred to chemical means for removal of small amounts of a liquid phase from other phases.

A method of coalescing an immiscible liquid suspended in another phase and a coalescing device, frequently termed a "coalescer", have found widespread use in removing liquid from both the gaseous phase, such as in aerosols, and from suspensions of one liquid in another liquid. Such devices are particularly effective where the volume of liquid removed is small in comparison to the volume of the phase from which it is removed. Typically, the equipment necessary to remove a liquid aerosol from a gas tends to be less complicated than that used to separate two liquid phases in which a first liquid phase is immiscible and suspended in a second liquid phase. This is generally true because in air-/liquid suspensions, gravitational effects tend to be more significant while surface energy, surface tension or interfacial tension effects tend to be less significant than with liquid/liquid suspensions.

The spectrum of applications where coalescers have been used to remove minor amounts of a first liquid phase, known as a "discontinuous phase" or "suspended phase", from a second liquid phase in which it is suspended, known as the "continuous phase" or "suspending phase", covers a considerable range of situations. For example, coalescers have been used most often to remove or separate small amounts of moisture from petroleum based fuels, including gasoline, diesel and aviation fuels, such as kerosene; remove moisture from cleaning fluids; separate oil from coolants and parts cleaners; remove oil contamination found in natural bodies of water; separate immiscible solvent systems used in extraction processes, etc.

Numerous mechanisms and models have been proposed to describe coalescence of a droplet of the discontinuous phase from the continuous phase and the ease or difficulty of separation of the immiscible phases. The factors which affect the coalescence process include the physical properties of the phases, such as density, viscosity, surface tension, and interfacial tension (IFT). In addition, the properties of the system, such as drop size, curvature of the interface, temperature, concentration gradients and vibrations also affect coalescence significantly. While any or all of these factors may be significant in a particular situation, properties such as density, drop size and interfacial tension appear to be among the factors which are of most significance and often over which the least control can be exercised in difficult separations of two immiscible liquids. Thus, all other things being equal, where the densities of two liquids differ only slightly, separation becomes more difficult. This is also true of the interfacial tensions of the liquids involved. In those situations in which the droplets are greater than $10\mu$ in diameter (primary emulsions) coalescence and separation is much easier to effect frequently with the discontinuous phase settling by gravity after coalescence to form a heterogeneous layer. When the droplets are smaller than $10\mu$, particularly less than $1\mu$ in diameter, secondary emulsions or secondary hazes result from which the discontinuous phase is much more difficult to coalesce. The latter frequently occurs where the emulsion has been formed by rigorous agitation or the inclusion of a surface active agent. Where emulsification to form the secondary haze occurs purely by mechanical means, coalescence may be accomplished much more readily by conventional coalescence methods and apparatus. Where the secondary haze results from surface active materials, which influence the interfacial tensions of the liquids, separation becomes more difficult.

The type of coalescer employed depends on the difficulty of separation or coalescence, as influenced by the factors identified above. Thus, in some situations, equipment may be very simple, such as those employing baffles, and range to more complex devices containing different types of packing. The type of fluids being separated frequently determines the packing used. Thus, both the shape of the packing material and its composition influence the efficiency of coalescence and separation. For example, the coalescing apparatus used to separate oil and water typically contain tubes, plates, disks, spears, rods, fibers or other internal structures designed to capture oil. Conventionally, glass has been the most often used packing material and while in some instances membranes have been employed in coalescers, as well as the packings listed above, fibers have been the preferred form of packing. Currently, glass fibers seem to have found the most widespread application in coalescers.

In recent years, both household and industrial requirements have led to the demand for purer liquids, including drinking water, solvents, liquids used in industrial processes, and fuels. To satisfy the more stringent specifications required for such materials, requirements have increased with regard to the effectiveness, efficiency and capacity of equipment used to purify these liquids. Manufacturers of such equipment have also striven to provide greater durability and longer interval periods between maintenance, regeneration or replacement of components. In the field of liquid/liquid separation, coalescers have frequently been expected to perform a filtration function to remove particulate matter, in addition to their primary function of coalescing a discontinuous phase.

A typical, conventional coalescing-separating apparatus is illustrated in FIG. 1. The coalescer-separator unit 10 includes a housing 12 having a divided base. An inlet 14 is provided to introduce contaminated liquid through the housing, the liquid then passing through an inlet chamber 16 and thereafter through a coalescer inlet 18 into a coalescer cartridge 20. After passing in an inside-out flow direction through an appropriate packing which defines the walls 22 of the coalescer cartridge, the fluid passes into the body of the housing and thereafter through the walls 32 of the separator cartridge 30 in an outside-in flow path. The external surface of the walls of the separator are provided with a material having a surface energy such that because of the surface tensions of the continuous and discontinuous phases, the liquid forming the continuous phase can pass through the walls of the separator and into the separator body while the liquid which is immiscible therewith is prevented from entering the separator body. In effect, the liquid forming the discontinuous phase, which is coalesced into larger droplets by the coalescer, is repelled in the vicinity of the separator wall 32. The continuous phase which enters the separator cartridge 30, through the separator wall 32, thereafter passes through the separator outlet 28 into the outlet chamber 26 and finally out the housing outlet 24. The coalesced drops of liquid originally in the discontinuous phase flow to the floor or base 36 of the housing unit, situated above the inlet chamber 16 and outlet chamber 26, and out the discontinuous phase outlet or drain 34.

In some industries, the demands for increased capacity have resulted in an increased size of the coalescer units. FIG. 2 represents a plan view of the interior of a conventional coalescing-separating apparatus intended to provide large scale capacity for separation of a discontinuous phase. As may be noted, while the apparatus includes only two separator elements, numerous coalescer units are provided. In this arrangement, fluid enters the inlet 14 of the housing 12 where it then flows, by separate paths, into the inlets (not shown) of the different coalescer units and afterwards through the packing of each coalescer unit 20 into the housing. The liquid then passes into the section of the housing containing the separator elements 30 where the fluid, largely depleted of the discontinuous phase liquid, passes through the walls 32 of the separator units, into the body of the separator units, thereafter passing through the outlet of each of the separator units and out of the housing outlet 24. While the capacity of the apparatus shown in FIG. 2 has been increased as compared to the type illustrated in FIG. 1, such an arrangement results in an uneven flow distribution. That is, a fluid flow or velocity gradient exists between the different regions within the housing. In the arrangement shown in FIG. 2, the gradient exists as a side-to-side gradient in which the row of coalescer units closest to the separators process more fluid than do the remaining coalescer units. At the same time, the separator units have an uneven flow distribution about their circumferences because of their proximity to the coalescer units.

As indicated above, secondary emulsions or hazes present one of the most difficult separation problems where physical methods are used exclusively to separate and remove the discontinuous or dispersed phase. While coalescer-separator devices have been used with varying degrees of success to purify the continuous phase in such applications, the method and apparatus are accompanied by various shortcomings. First, 100% coalescence and removal of the discontinuous phase proves difficult simply because of the very small droplet size of the dispersed phase, which itself may be caused in part by the presence of a surface active substance. Secondly, in those situations in which a surface active material is present, which is a common situation, the change of surface tension attributable to the surface active substances make coalescence difficult, short of removing those surface active substances prior to a coalescing treatment. Third, after a period of use, the surface active substances found in many of these chemically induced emulsions are believed to coat the active surfaces of the coalescer packing, which currently is most often glass fibers, thus "disarming" or rendering the coalescer ineffective. For such reasons, coalescer-separator devices do not provide the degree of purity sought from liquids containing such surface active substances and/or require frequent changing of coalescer elements.

This type of problem is being encountered much more frequently in fuel related industries. Petroleum based fuels tend to pick up moisture, particularly upon storage. Filter-coalescer-separator devices have conventionally been used to remove entrained water from such fuels. In recent years, however, additives, particularly surfactants, have been used in increasing amounts in such fuels. Accordingly, to achieve the same minimal concentrations of moisture, treatments to remove moisture after blending, transporting and storage of such fuels have required more frequent changing of coalescing units. Although the inclusion of phenolic or acrylic resins which primarily act as binding agents for glass fiber packings has had a collateral effect in reducing disarming somewhat but disarming still occurs in high surfactant-containing liquids.

SUMMARY OF THE INVENTION

The present invention is directed to a coalescer-separator apparatus which overcomes many of the shortcomings of conventional coalescer devices. Because of the improved flow distribution resulting from the present invention, the life of the coalescer units employed is significantly increased and effective separation of a discontinuous phase, such as water typically found in petroleum based fuels, is greatly increased. In addition, because of the arrangement of the components of the present invention, a more compact unit may be prepared which achieves the same or an improved level of performance as compared to larger conventional units.

To achieve these results, a liquid purification system is provided by the present invention which includes at least one coalescing assembly, each of which includes at least one coalescing element or unit for coalescing the discontinuous or suspended (rather than dissolved) phase of a mixture of immiscible liquids into droplets and at least one separating assembly, each of which includes at least one element or unit for separating the coalesced droplets from the continuous phase. In one aspect of the present invention, the coalescing assemblies and/or element(s) and the separating assemblies and/or element(s) are arranged in stacked or superposed relationship. Typically, the coalescing element(s) and separating element(s) are enclosed within a housing having fluid, particularly liquid, inlet and outlet passages. The housing includes an outlet for the liquid which originally formed the continuous phase and usually an outlet for the liquid which originally formed the discontinuous liquid phase.

Another aspect of the present invention relates to a system for separation of two partially or wholly immiscible liquids including at least one coalescing element and at least one separating element in which the coalescing element(s) includes a porous material having a surface energy (or critical wetting surface tension) which is greater than the surface tension of the continuous liquid phase but less than the surface tension of the discontinuous liquid phase. Preferably, the material forming the phase separating portion of the coalescer has a fibrous configuration.

Another aspect of the present invention relates to a method of separating a discontinuous phase liquid, such as water, from a continuous phase liquid, particularly an organic liquid, such as a fuel. The method involves introducing a mixture of the discontinuous and continuous phase liquid to at least one coalescing element that includes a packing material having a critical wetting surface energy intermediate the critical wetting surface tension of the discontinuous and continuous phase liquid to form droplets of the discontinuous phase. Thereafter, the mixture of the continuous phase liquid and the droplets of the discontinuous phase liquid are conducted to at least one separating element which permits passage of the continuous phase liquid but substantially resists or prevents passage of the discontinuous phase liquid droplets, whereby the continuous phase liquid is separated from the droplets of discontinuous phase liquid

BRIEF DESCRIPTION OF THE DRAWINGS

FIG. 3a illustrates an embodiment of the present invention in which coalescing elements are superposed above separating elements.

FIG. 3b is a sectional view of the embodiment of FIG. 3a taken along line III—III.

DESCRIPTION OF THE PREFERRED EMBODIMENTS

Figure 1:
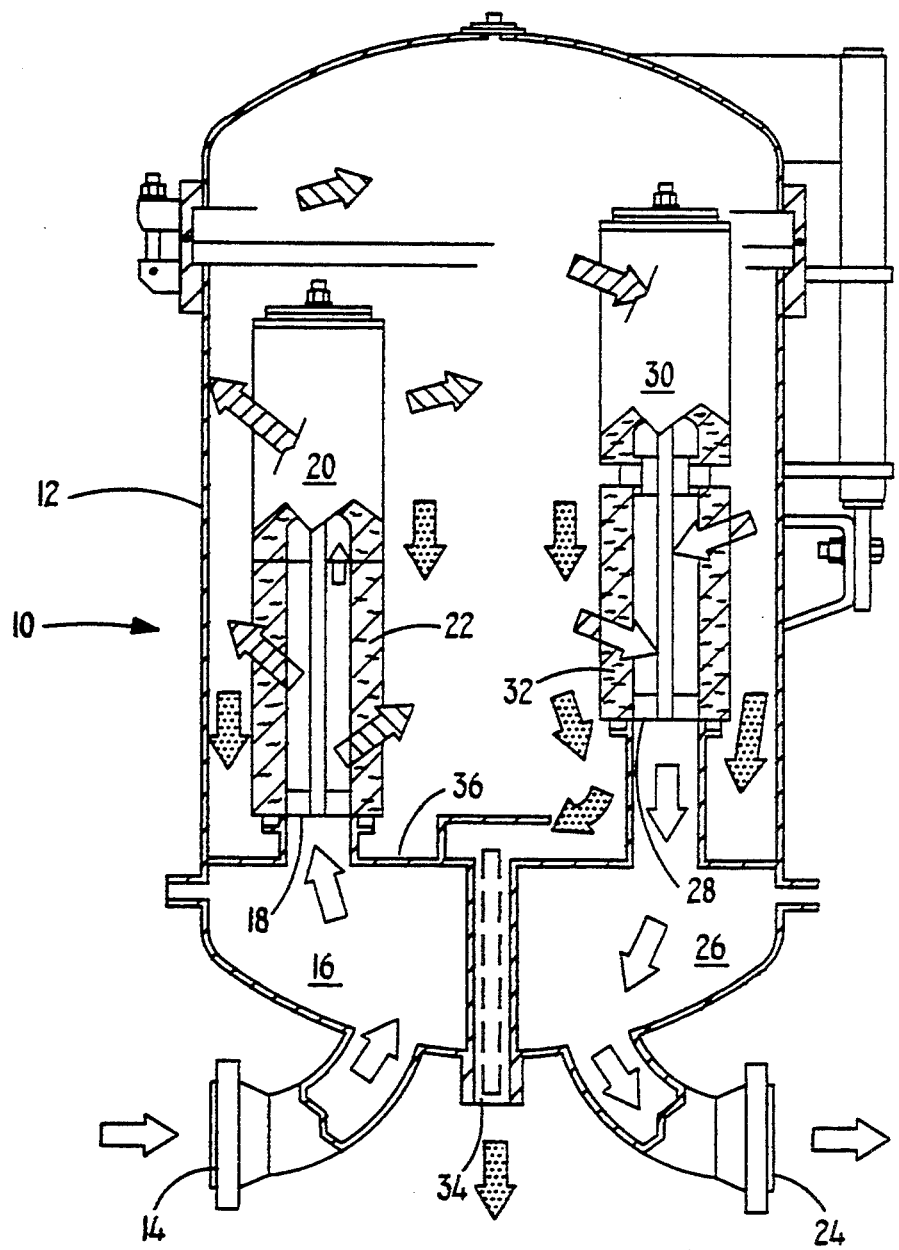
FIG. 1 illustrates an elevational, sectional view with a partial cutaway of a conventional coalescer-separator liquid separation system.
Figure 2:
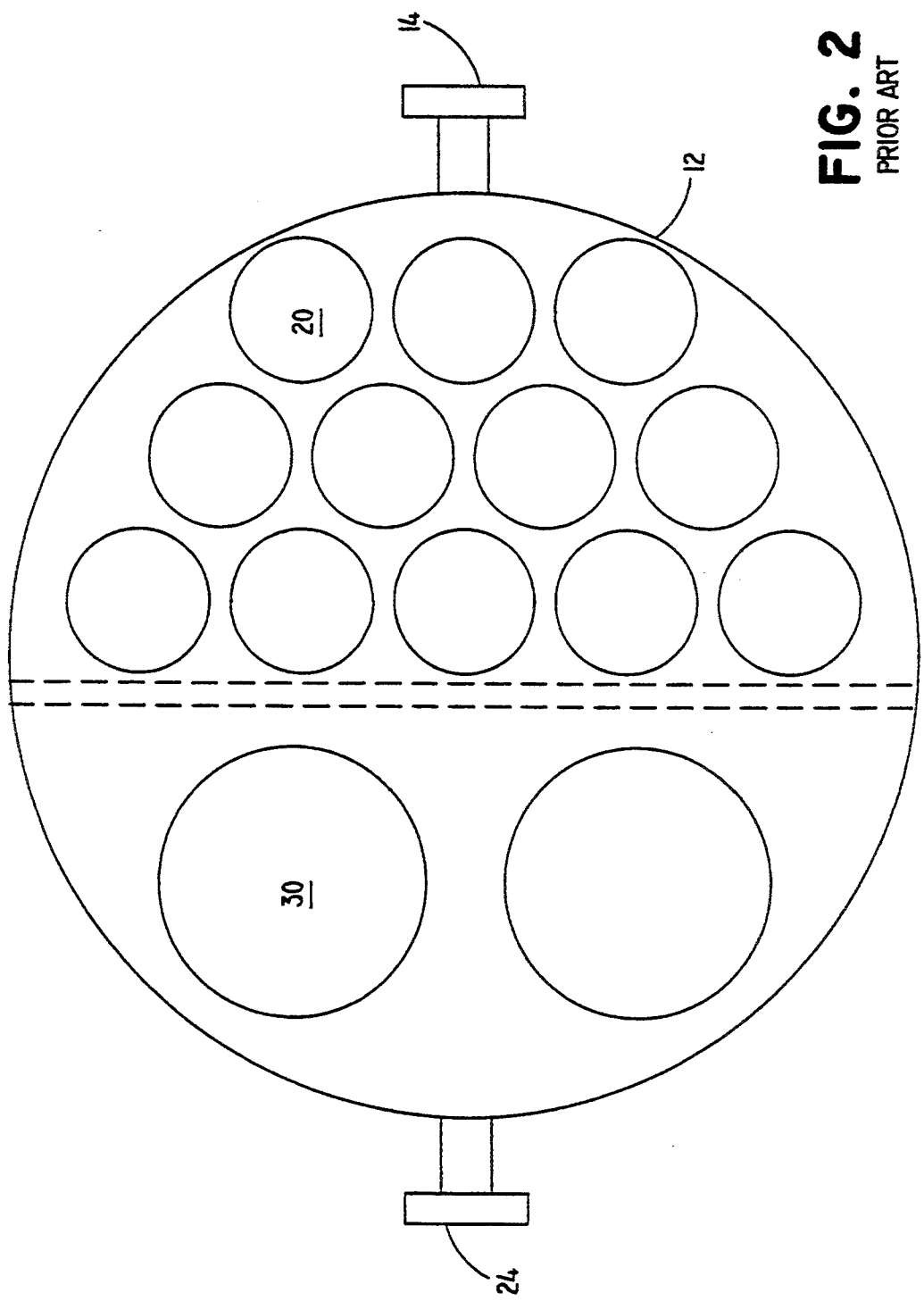
FIG. 2 shows a plan view of the interior of a conventional coalescer-separator liquid separation system having a plurality of separating elements and a plurality of coalescing elements.

As indicated above, the present invention is directed to an immiscible liquid/liquid coalescing and separating system which, in comparison to conventional liquid coalescing-separating systems, provides longer useful life of the coalescer elements, may be formed as a smaller unit than a similar conventional system of comparable capacity and performance, and, because of the arrangement of the elements, results in an improved flow distribution which is more effective in separating liquid components.

In describing the present invention, terms such as "coalescer", "coalescing element", "coalescing unit" and like terms, in both singular and plural, have been used to describe the device or article which coalesces the discontinuous or polydivided phase of a mixture of immiscible liquids to form droplets. Regardless of the term used, the coalescing step employing such device occurs in the same manner. While the term "coalescer" generically describes such a device and the term "coalescing element" describes one component unit or cartridge of a system which may contain multiple coalescing and separating units, the present invention may be construed as containing as few as one coalescer unit in a coalescer-separator system to a plurality of such units. In addition, such coalescing units may be fixed and not removable (without doing significant damage to the system), or preferably, contain easily removable and replaceable elements. In a similar manner, terms such as "separator", "separating element", "separator units", and like terms have meanings similar to each other as do those relating to coalescers, discussed above.

When a liquid is brought into contact with the upstream surface of a porous medium and a small pressure differential is applied, flow into and through the porous medium may or may not occur. A condition in which no flow occurs is that in which the liquid does not wet the material of which the porous structure is made.

A series of liquids can be prepared, each with a surface tension of about 3 dynes/cm higher compared with the one preceding. A drop of each may then be placed on a porous surface and observed to determine whether it is absorbed quickly, or remains on the surface. For example, applying this technique to a 0.2 micrometer porous polytetrafluoroethylene (PTFE) filter sheet, instant wetting was observed for a liquid with a surface tension of 26 dynes/cm. However, the structure remains unwetted when a liquid with a surface tension of 29 dynes/cm is applied.

Similar behavior is observed for porous media made using other synthetic resins, with the wet-unwet values dependent principally on the surface characteristics of the material from which the porous medium is made, and secondarily, on the pore size characteristics of the porous medium. For example, fibrous polyester, specifically polybutylene terephthalate (hereinafter "PBT") sheets, which have pore diameters less than about 20 micrometers, were wetted by a liquid with a surface tension of 50 dynes/cm, but were not wetted by a liquid with a surface tension of 54 dynes/cm.

In order to characterize this behavior of a porous medium, the term "critical wetting surface tension" (CWST) has been defined as described below. The CWST of a porous medium may be determined by individually applying to its surface, preferably dropwise, a series of liquids with surface tensions varying by 2 to 4 dynes/cm, and observing the absorption or non-absorption of each liquid. The CWST of a porous medium, in units of dynes/cm, is defined as the mean value of the surface tension of the liquid which is absorbed and that of a liquid of neighboring surface tension which is not absorbed. Thus, in the examples of the two preceding paragraphs, the CWST's are, respectively 27.5 and 52 dynes/cm.

In measuring CWST, a series of standard liquids for testing are prepared with surface tensions varying in a sequential manner by about 2 to about 4 dynes/cm. Ten drops of each of at least two of the sequential surface tension standard liquids are independently placed on representative portions of the porous medium and allowed to stand for 10 minutes. Observation is made after 10 minutes. Wetting is defined as absorption into or obvious wetting of the porous medium by at least nine of the ten drops within 10 minutes. Non-wetting is defined by non-absorption or non-wetting of at least nine of the ten drops in 10 minutes. Testing is continued using liquids of successively higher or lower surface tension, until a pair has been identified, one wetting and one non-wetting, which are the most closely spaced in surface tension. The CWST is then within that range and, for convenience, the average of the two surface tensions is used as a single number to specify the CWST.

Appropriate solutions with varying surface tension can be prepared in a variety of ways, however, those used in the development of the product described herein were:

TABLE 1

| Solution or fluid | Surface Tension, (dynes/cm) |
|---|---|
| Sodium hydroxide in water | 94–110 |
| Calcium chloride in water | 90–94 |
| Sodium nitrate in water | 75–87 |
| Pure water | 72.4 |
| Acetic acid in water | 38–69 |
| Ethanol in water | 22–35 |
| n-Hexane | 18.4 |
| FC77 (3M Corp.) | 15 |
| FC84 (3M Corp.) | 13 |

A first aspect of the present invention is directed to a coalescing-separating system employing both a coalescing assembly which includes at least one coalescing element and a separating assembly which includes at least one separating element in which the coalescing assembly or element is arranged with respect to the separating assembly or element in a stacked or superposed relationship. When cylindrical coalescing and separating elements are employed, the cylindrical axes of the elements are arranged substantially vertically. In its simplest form, the present invention may include a single coalescing element or coalescer and a single separating element or separator. This arrangement could be used for coalescers and separators formed from any suitable media, which media are arranged in any suitable configuration. In its simplest form, the medium serving as the coalescer may be provided in sheet form and placed in proximate but spaced relationship to the separator, which also may be in sheet form. In such an embodiment, both the coalescing element and the separating element, independent of each other, may be formed either as flat sheets or as pleated or corrugated sheets in which the peaks and troughs of each sheet lie in planes parallel to one another. The preferred configuration of the coalescer and separator is cylindrical in which the functional portion of the coalescer and separator (i.e., that portion of the coalescer or separator performs the coalescing or separating function, respectively) is, independently, formed as a cylinder around the axis of the element. In either case, the functioning portion of the element may be arranged as a cylindrical sheet or mat, a cylindrical pleated sheet or mat, or a helically or spirally wound sheet or mat, the later pertaining particularly to coalescers. In the case of separators, the functioning portion of the element may also be a web or, preferably, a screen.

The coalescers and separators or coalescing and separating elements of the present invention may be manufactured as a single unit with one or more coalescing stages or portions and one or more separating stages or portions. Most preferably, the coalescing and separating elements are manufactured and assembled as separate units. In practice this permits removal and replacement of the separate elements.

FIG. 3a illustrates an embodiment of the present invention in which a plurality of coalescing elements 20 are individually superposed above a plurality of separating elements 30. The coalescing elements 20 and separating elements 30, illustrated in the embodiment of FIG. 3a, are located within housing 12. A liquid inlet is provided in a wall of the housing for introducing liquid, in this embodiment, above the coalescer elements. Liquid inlets 18 are provided in the upper end of each cylindrical coalescing element 20 for introduction of contaminated liquid thereto. Each coalescing element has a packing which defines the cylindrical wall 22 of the coalescing element. The packing contains a material which has a critical wetting surface energy intermediate the surface tensions of the liquids forming the continuous and discontinuous phases.

In a like manner, each separating element includes a perforated wall 32 which is formed from, or has an outer surface coating of, a material which repels (or is not wetted by) a liquid of the discontinuous phase, which may be termed the "discontinuous phase barrier material". Such a material should not react with any liquid or other substance present in the mixture of immiscible liquids. When used as a coating on the wall of the separator, such material should remain substantially immobilized thereon. Typically, the critical wetting surface energy of this material is selected to permit passage of the liquid forming the continuous phase through the small pores of the material defining the wall of the separator element, and when the separator is a cylindrical element, as shown in FIG. 3a, to thereby permit ingress of that liquid to the separator but to repel or prevent ingress to the liquid which forms the discontinuous phase. For example, in systems in which water is the discontinuous phase, materials are selected as, or are coated on, the wall of the separator which have a critical surface energy or CWST below the surface tension of water. For applications in which water or a liquid having a similar surface tension constitutes the discontinuous phase, materials preferred for use as the discontinuous phase barrier material for forming or coating the separating element wall include silicones, such as a silicone treated paper, and, preferably fluoropolymeric materials of which fluorocarbons or perfluorocarbons or perfluoro resins are particularly preferred. Examples of preferred materials for use as the packing or coating in the separator include polytetrafluoroethylene (PTFE) or other polyfluorinated polymers such as fluorinated ethylene propylene (FEP) resins.

A preferred embodiment includes a coating of one of these materials on a stainless steel screen, or a pleated paper pack. Other suitable materials include those disclosed in Miller et al. U.S. Pat. No. 4,759,782, specifically incorporated herein by reference. Generally, the functional or discontinuous phase barrier material portion, which is also the continuous phase liquid-passing portion, of the separator is selected to have pores smaller than a substantial amount of the droplets of the liquid which originally formed the discontinuous phase.

Typically the pore size of the functional part of the separator wall is selected to be about 5μ to about 140μ, preferably about 40μ to about 100μ. Most preferably, and particularly when the discontinuous phase is water, the pore size is about 80μ.

Other media suitable for use as the functional or discontinuous phase barrier material portion of the separating element are porous, fibrous fluorocarbon structures of the type described in Hurley et al. U.S. Pat. No. 4,716,074, specifically incorporated herein by reference. Such materials are porous, fibrous structures having good structural integrity which include fluorocarbon polymer fibers and a fluorocarbon binder. Such media, while suitable for use in the present invention, are intended primarily as support and drainage layers in filtration cartridges.

Although sharing some similarities in composition and preparation with the structures described by Hurley et al., the medium most preferred in the present invention is a calendared, porous, fibrous fluorocarbon structure which includes PTFE fibers in a fluorocarbon binder, preferably a FEP binder. The fibers employed are bleached and water washed PTFE fibers having diameters ranging up to about 70 micrometers, preferably from about 54 to about 70 micrometers. Most preferred are PTFE fibers having a nominal diameter of about 65 micrometers. This material is prepared to have a sheet weight of about 15 to about 35 grams/ft$^2$, preferably about 15 to about 25 grams/ft$^2$. Most preferred is a medium having a sheet weight of about 21.5 grams/ft$^2$.

As indicated above, although similarities exist in both the preparation and composition between the preferred porous, fibrous fluorocarbon media used as the discontinuous phase barrier material of the present invention and the media described in U.S. Pat. No. 4,716,074, major distinctions also exist between these materials. Thus, the material which is most preferred in the present invention is calendared to a thickness of about 50 to about 90%, preferably about 75%, of its original thickness. Such calendaring raises both the $\Delta P$ and bubble points of the media and produces a more efficient separating medium which achieves a substantially uniform flow velocity perpendicular to and in contact with all portions of the upstream surface. In contrast, an uncalendared material demonstrates both a high cross flow (movement or diffusion in an edge-to-edge direction rather than surface-to-surface direction) and a substantially imperceptible resistance to fluid flow in an upstream-to-downstream direction through the medium. Essentially, fluids passing through such media take the path of least resistance and may not contact all portions of the medium. Thus, the process of calendaring the medium provides the qualities desirable for the medium of the present invention while making such a medium substantially unsuitable as a support and drainage layer. Likewise, a material which demonstrates suitability as a support and drainage layer is frequently not particularly effective as a discontinuous phase barrier material.

This preferred medium, having an average thickness before calendaring of about 0.015 to about 0.025 inch, preferably about 0.018 to about 0.022 inch and most preferably about 0.019 inch is calendared to a thickness of about 0.004 to about 0.009 inch, preferably about 0.005 to about 0.007 inch and most preferably to about 0.006 inch. The calendaring is performed at ambient temperature under a pressure suitable to achieve a compression and reduction in thickness to produce the $\Delta P$ and Bubble Point sought. The calendared product has a first Bubble Point (which reflects the size of the largest pore), measured in ethyl alcohol of about 0.5 to about 4 inches (about 1.3 to about 10.2 cm) of water, preferably about 2 to about 3.5 inches (about 5.1 to about 8.9 cm) of water, preferably about 2.75 inches (about 7 cm) of water. The calendared medium also has a Mean Pore Bubble Point measured in ethyl alcohol of about 2 to about 10 inches (about 5.1 to about 25.4 cm) of water, preferably about 3.5 to about 6 inches (about 8.9 to about 15.2 cm) of water. Most preferably the Mean Pore Bubble Point is about 4.5 inches (11.4 cm) of water. The calendared sheet of PTFE fibers bound with FEP binder has a pressure drop across the medium ($\Delta P$) as measured with a face velocity of air at 28 ft/min., of about 0.5 to about 12 inches (about 28 to about 1.17 Frazier number or about 1.3 to about 30.5 cm) of water, preferably about 1 to about 5 inches (about 14 to about 2.8 Frazier number or about 7.6 to about 12.7 cm) of water and most preferably 1.4 inches (about 10 Frazier number or about 3.5 cm) of water.

After passing into the separator 30 through wall 32 in an outside-in direction, the liquid forming the continuous phase passes out of separator outlet 28 and into the outlet chamber 26. Thereafter, the liquid which originally formed the continuous phase passes out of the device through outlet 24. The liquid which formed the discontinuous phase in the original liquid mixture collects at the floor or base 36 and is removed from the apparatus through the discontinuous phase outlet or drain 34.

In operation, a mixture of immiscible liquids is introduced to the housing 12 through the immiscible liquid inlet 14. After entering the housing, the mixture flows in the direction of the arrows shown in FIGS. 3a and 4. Namely, liquid enters each coalescing element through the inlet portion 18 in one of the end caps and, since the other end cap 19 seals the unit completely, liquid flows through the porous packing which defines the wall 22 of each coalescing element. Each coalescing element is held in fixed position with respect to another juxtaposed coalescing element and/or to the housing wall. This may be achieved by specific locating and/or fixing means (not shown) or, alternatively, at least in part, by using liquid barriers 38a, located between elements, or by liquid barriers 38b, located between elements and the interior wall. These barriers may be formed in separate sections or as a single unit. These liquid barriers primarily act as liquid sealing elements and assure that the liquid flowing into the housing under the force of gravity or an additional pressure can only flow to the bottom of the housing by first entering the inlet portion 18 of each of the coalescing elements and flowing through the walls of the coalescing elements. After passing through the wall of the coalescing element in an inside-out direction, the liquid flows into each separating element through a wall portion 32 in an outside-in direction. Due to the composition from which the external wall of the separating element is formed or on which a coating is placed, only the continuous phase enters the separating element, leaving many of the droplets of the discontinuous phase liquid formed by the coalescing elements to fall to the partition or bottom 36 located between and below the separating elements (in the embodiment shown in FIG. 3a). This liquid is then removed from the housing through the discontinuous phase outlet or drain 34. The continuous phase liquid passes out of each separating element through outlet 28 into the outlet chamber 26 where it passes from the housing through continuous phase outlet 24.

Figure 4:
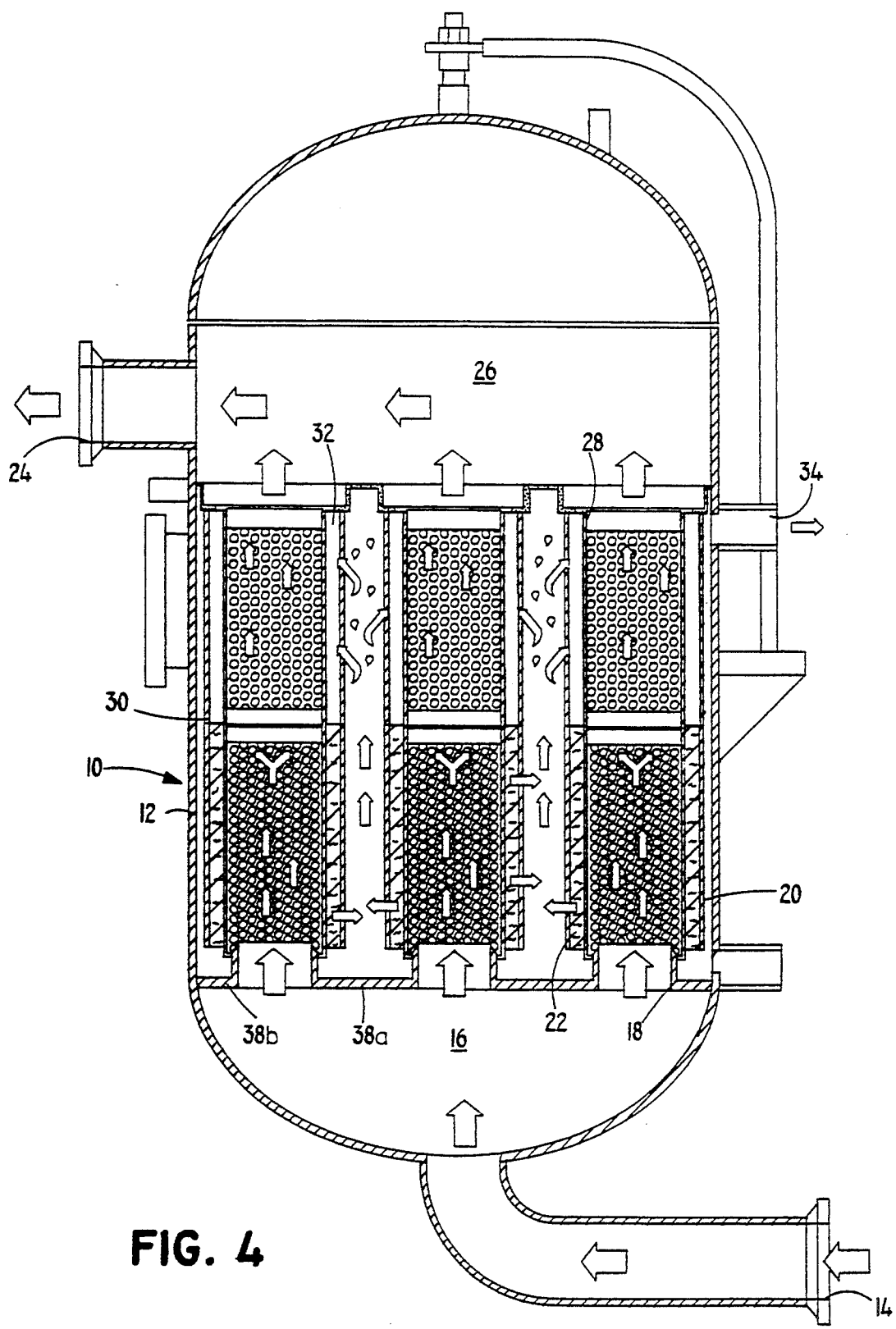
FIG. 4 illustrates another embodiment of the present invention in which separating elements are superposed above coalescing elements.
Figure 5:
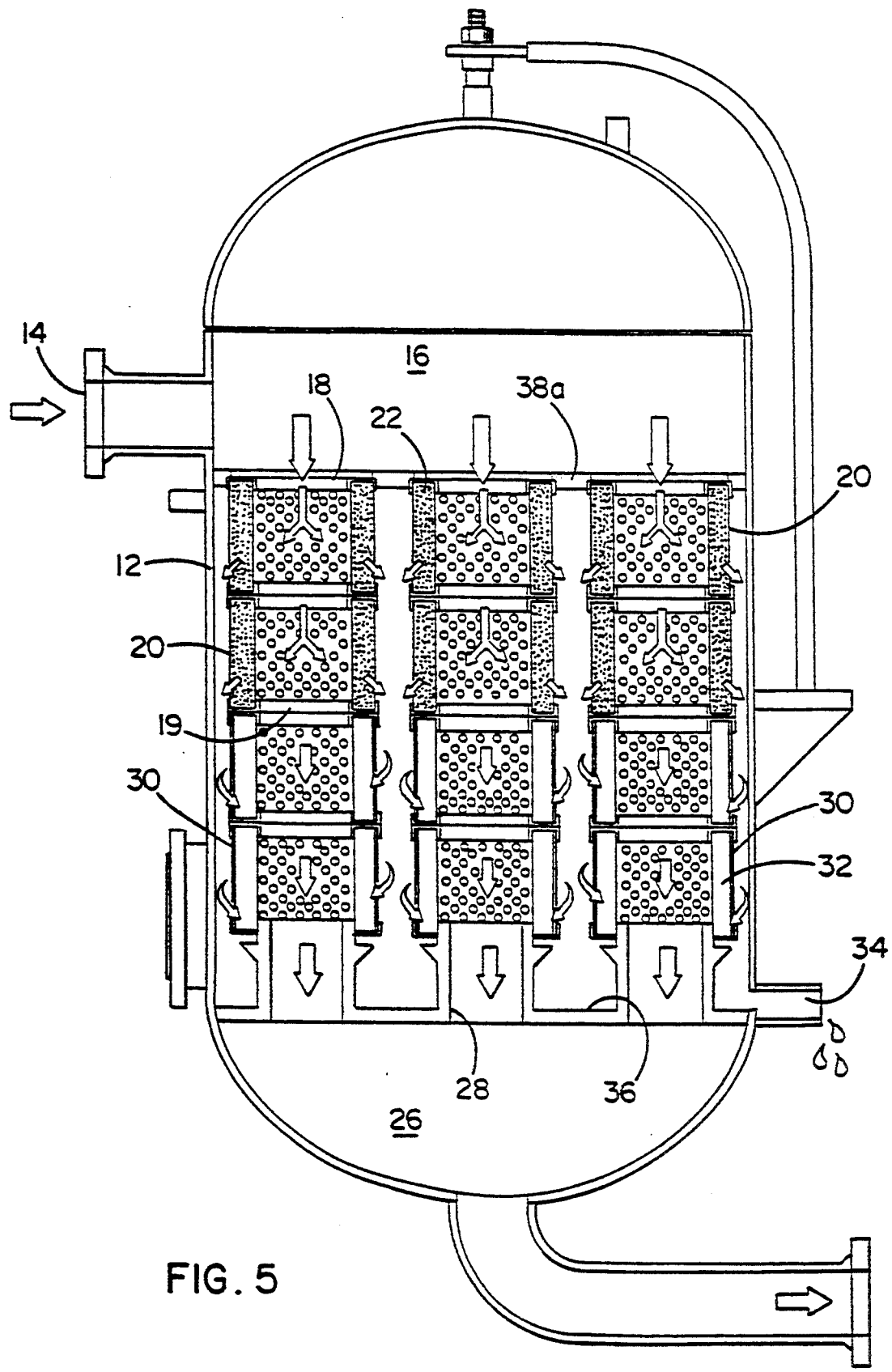
FIG. 5 illustrates an embodiment of the invention in which a plurality of coalescing elements are arranged in series.
Figure 6:
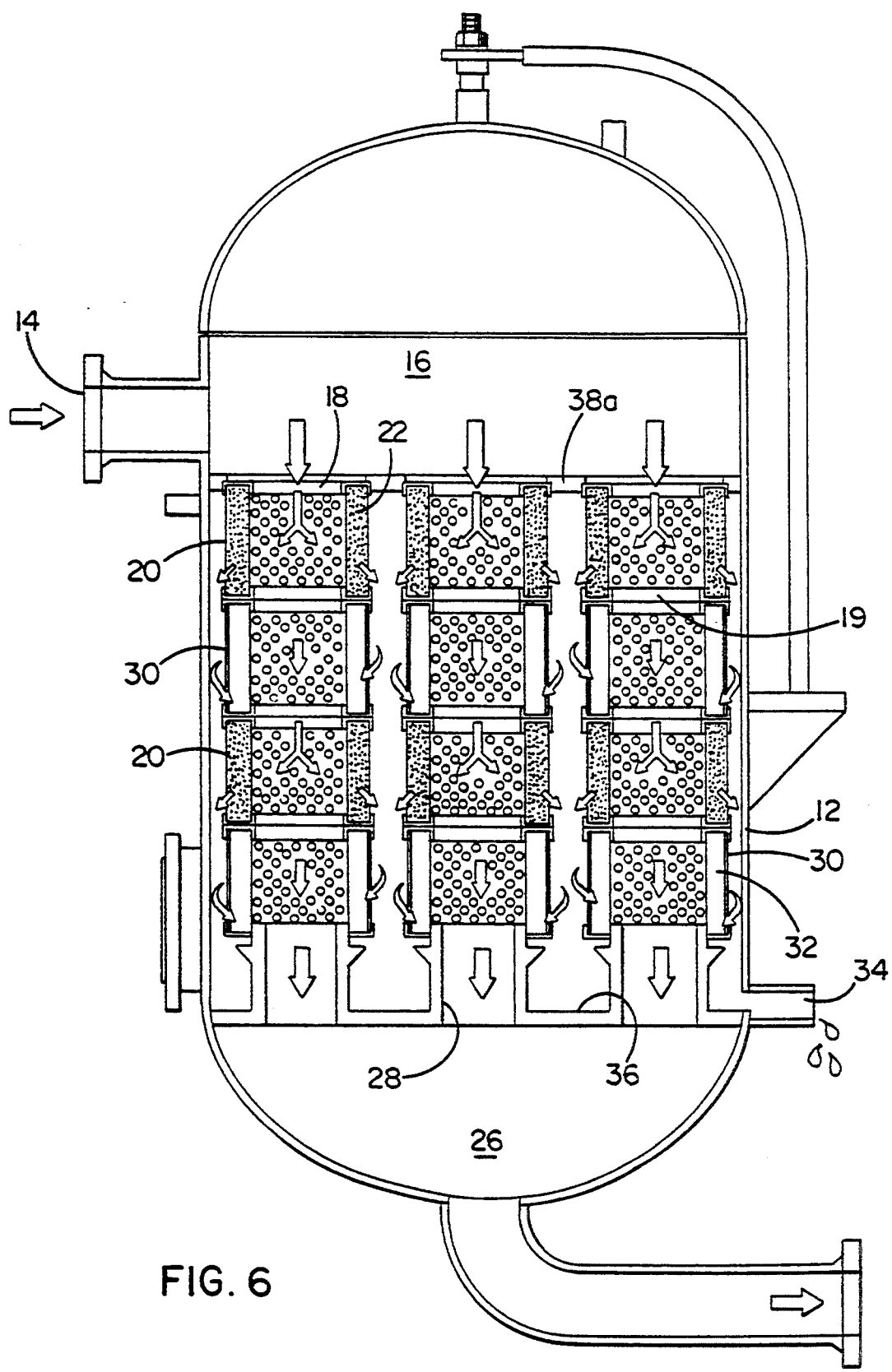
FIG. 6 illustrates an embodiment of the invention in which a plurality of coalescing elements and a plurality of separating elements are arranged in superposed and alternating relationship.

FIGS. 3a and 3b illustrate an embodiment of the present invention containing an assembly of seven liquid coalescing elements superposed above an assembly of seven liquid separators. However, while this is a preferred embodiment and arrangement, the present invention is not limited thereto and other embodiments and variations are possible. The particular number and arrangement of separating and coalescing elements depends on the specific mixture being separated. The arrangement shown in FIG. 3a is most suitable, and is preferred, for immiscible liquid mixtures in which the discontinuous phase is more dense than the continuous phase, as for example, a mixture in which water is suspended in a petroleum based fuel. In such a situation, the more dense discontinuous phase would tend to move in the direction of the separating elements 30 after passing through the coalescing elements 20. Where the discontinuous phase is less dense than the continuous phase, for example, water suspended in $CCl_4$, it is preferred to position separating elements above coalescing elements. An embodiment such as this is illustrated in FIG. 4. While the foregoing represents the preferred arrangements, where the discontinuous phase is present at very low inlet concentrations, for example, concentrations of about up to about 0.02, the reverse orientation of FIG. 4 has been shown to be relatively effective even when the discontinuous phase is more dense. Also, rather than a single coalescing element being arranged in superposed relationship with respect to each separating element, a coalescing assembly composed of a plurality of coalescing elements may be superposed in series with respect to each separating element.

The series relationship could take a variety of forms. In those embodiments in which a plurality of coalescing elements are used for each separating element employed, and more than one separating element may be used, the coalescing elements are arranged, for example, within an assembly, in parallel relationship with one another and collectively in series and superposed relationship with the one or more separating elements employed. In this arrangement, a tier of coalescing elements, arranged in parallel with one another, would be placed above or below one or more separating elements. In this embodiment, although one coalescing element may be arranged coaxially with respect to each separating element employed, such an arrangement is not required.

In another embodiment of the present invention, the coalescing (C) and separating (S) elements are arranged in alternating series, and preferably, coaxial, head to tail arrangement (i.e., C-S-C-S). Such an arrangement might be used with mixtures which are difficult to separate. With this arrangement, the liquid originally present in the discontinuous phase, which not sufficiently coalesced to be rejected by the walls of the separator, is passed on to the next coalescer in the series, the droplets of liquid which were formed from the discontinuous liquid growing in size after passing through each successive stage.

In another embodiment of the present invention, one which is preferred, a coalescing assembly is formed from a plurality of coalescing elements which are arranged in superposed, stacked and coaxial arrangement in series with one another and are collectively positioned in series with a separating element (e.g., C-C-C-S). Further details of such arrangement are indicated below.

In addition, while FIG. 3b indicates six superposed coalescing-separating elements placed radially around a central separating-coalescing element, the number of radially placed separating and coalescing elements in superposed relationship may be increased or decreased as may the centrally positioned separating and coalescing elements. Although the radially arranged elements result in the most compact liquid purification device with the best flow distribution, other arrangements, such as a linear or rectangular arrangement may be used for particular purposes.

In those instances in which the coalescing and separating elements are manufactured as separate units, the blind or closed end caps of the coalescing and separating elements may be designed such that they interlock with one another. Alternatively, means may be provided to locate each element within the housing so that they remain in superposed positions. When a plurality of coalescing elements are employed for each separating element used, the coalescing elements may be arranged in series with respect to one another (for example, C-C-C-S), preferably in a stacked or superposed arrangement. In such an arrangement, the coalescing elements may be interconnected in a number of ways. For example, those coalescing elements that first encounter the incoming mixture of immiscible liquids may be joined to successive downstream coalescing elements in a head-to-tail arrangement by conduits which join an outlet portion of each coalescing element (which differ from the blind end caps of the coalescing elements of FIGS. 3a and 4 in that they have fluid outlets in the downstream end caps) to the next downstream element. In such an arrangement, the outlet end of each conduit would be connected to the inlet portion of the coalescing element next in series and all of the coalescing elements in the series would have both inlet and outlet portions with the exception of the last coalescing elements in each series which are located in a stacked relationship with respect to the separating elements and would have only a fluid inlet. These last or end-of-series coalescing elements would be essentially as shown in FIG. 3a, having an end cap with an inlet and a blind or sealed end cap at the other end of the coalescing element. In an alternative arrangement, rather than using conduits between successive coalescing elements, the fluid outlet portion of one coalescing element may be constructed to sealingly engage the inlet portion of the downstream coalescing element.

In still another embodiment using a plurality of coalescing elements for each separating element, the coalescing elements, either individually or as assemblies of a plurality of coalescing elements, could be placed above one another in series, preferably stacked, but spaced apart from one another. In this embodiment, all of the coalescing elements would include inlet portions 18 and blind end caps 19 at the opposite end of each element, such as those shown in FIGS. 3a and 4. Rather than liquid flowing continuously from one coalescing element to the next downstream coalescing element in the series through the center of each element and out through the packing defining the walls of the last coalescing element, as in the embodiment discussed immediately above, each coalescing element would be provided with a closed or sealed end cap and liquid would flow only out through the walls of each coalescing element and into the inlet portion of the next successive downstream coalescing element. In such an instance, it would be preferable to use multiple barriers, such as 38*a* and 38*b*, to separate each successive coalescing element or tier of coalescing elements to direct liquid flow passing through the walls of the coalescing element in that tier or assembly to the inlet of the coalescing element in the next downstream tier.

FIG. 3*a* illustrates a device in which the liquid mixture inlet 14 is located in the wall of the housing immediately above the coalescer elements while the purified continuous phase liquid outlet 24 is located in the bottom of the housing communicating with the outlet chamber 26. Although these are preferred arrangements, the inlets and outlets can be located elsewhere in the housing. For example, in the embodiment shown in FIG. 3*a*, inlet 14 may be located in the top of the housing 38 while the liquid outlet 24 might be located in the wall of the housing. In the latter instance, the device would preferably have a flat bottom rather than the spherical bottom illustrated in FIG. 3*a* and the outlet 24 would be located close to the base of the device. In embodiments in which the separating elements are positioned above the coalescing elements as in FIG. 4, the relative positions of inlets and outlets may be reversed from those described for the embodiment shown in FIG. 3*a*. For example, the liquid mixture inlet 14 is located in the lower part of the housing below the coalescing elements while the continuous phase liquid outlet 24 is located at the upper part of the housing.

In embodiments of the present invention in which the coalescing elements and/or separating elements are intended for easy removal from the device for replacement or regeneration, the housing is designed such that either the top or bottom of the housing is removable. Since most frequently the coalescing elements will be discarded and replaced, the preferred system for the type of embodiment illustrated in FIG. 3*a* in which coalescing elements are superposed above separating elements includes a housing with a removable top or cover portion 38. Most preferably, the top is a swing-up cover, but alternatively, the top could include threading or pins to engage like threading or a bayonet base portion in the housing wall 42 or could be a spring loaded, counterbalanced, hinged cover as described by Miller et al., in U.S. Pat. No. 4,419,234. In those systems in which the separating elements are located above the coalescing elements, the housing may be constructed to include a removable bottom.

A pressurized feed may be used in some instances. Accordingly, the wall of the housing may also be provided with vents and pressure release valves, as well as fittings for inlet and outlet pressure gauges.

As indicated above, while in many instances separation can be adequately obtained by using coalescing elements and separating elements in equal numbers, to provide as compact a unit as possible with the smallest volume housing possible, and an adequate separation and satisfactory capacity in terms of flow rates, in many situations it is desirable to increase the ratio of the number of coalescing elements to the number of separating elements employed. While substantially the same as the ratio of coalescing elements to separating elements in many situations, the more pertinent parameter is the ratio of effective surface area of the coalescing elements to the effective surface area of the separating elements. To some extent this depends upon the size, shape and configuration of the functionally effective portions of the coalescing and separating elements. In most situations this corresponds to the planar surface area or cylindrical surface area (the height times the circumference of the functionally effective portion), also known as the "projected surface area", of the cylindrical element. When a pleated element is used either in the coalescing element or the separating element, a more pertinent measurement is the "effective surface area". This measurement of surface area departs somewhat from the measurement of the planar or cylindrical surface area since it is the actual area of the material as measured when the pleats or corrugations are removed and the material is extended (or the height times number of pleats times the depth of the pleat times 2). This measurement of surface area is greater than the cylindrical surface area. This may be taken into account in determining effective surface area.

In those instances in which the size, shape and configuration of both the separating elements and coalescing elements are the same, it is merely necessary to express the ratio of surface areas as a ratio of the number of units. Alternatively, when the configuration and diameter of both the separating elements and coalescing elements are the same, it may only be necessary to compare the height of the coalescing element to that of the separating element.

As suggested above, the ratio of the effective surface area of the coalescer or coalescing element to that of the separator or separating element varies with the separation to be effected. The factors to be taken into account in determining the appropriate ratio are the nature of the liquids which form the suspended or discontinuous phase and the suspending or continuous phase, the nature of the packing and discontinuous phase liquid barrier, and the volume and/or flow rate of the liquid mixture. These factors take into account the chemical and physical properties of both the liquids and dissolved materials (such as surface active substances) and the functional portion of the coalescing and separating elements, as well as their interaction with one another. For most purposes, however, this ratio this ranges from about 0.25 to 1 to about 10 to 1. When water forms the discontinuous phase and the liquid forming the continuous phase has a high viscosity, preferably, the ratio is about 5 to 1 to about 10 to 1. Alternatively, when the liquid in the continuous phase has a low viscosity preferably the ratio is about 0.25 to 1 to about 4 to 1. As used in discussing the present invention, "high viscosity" means about 50 cp or greater and "low viscosity" refers to less than about 5 cp.

In the stacked coalescer-separator arrangement of the present invention, any packing may be employed to form the coalescer wall through which the immiscible mixture of liquids passes which does not chemically react with or absorb any of the components of the liquid mixtures. Typically this would include materials such as glass, cork, and nylon. However, other materials, such as those listed in Pall et al. U.S. Pat. No. 3,268,442, specifically incorporated herein by reference, could be used in the stacked arrangement of the present invention.

In a particular aspect of the present invention, which is not restricted to the superposed arrangement of coalescer and separator, but which is preferably used therewith to provide even further benefits, a packing material is chosen for the coalescer having specific surface energy properties.

In this preferred aspect of the present invention, the packing is selected with a consideration of the mixture of liquids to be separated. In particular, the surface energy or CWST of the packing material is selected to be less than the surface tension of the discontinuous phase liquid and greater than the surface tension of the continuous phase. Suitable for use in the present invention as packing materials for the coalescing element are those having a pore size in the range of about $0.5\mu$ to about $25\mu$, preferably, about $0.5\mu$ to about $3\mu$ (especially for liquids having low IFTs) and most preferably, about $3\mu$. This is particularly preferred as the pore size of the preferred packing material discussed below. In general, the effective pore size may be selected based on the relationship $\mu = 50/B.P.$ where $\mu =$ effective pore size in microns and B.P. = the open end bubble point of the material in inches of water using an ethanol containing liquid. (The constant is determined, in part, by the thickness and nature of the material used and the conditions of measurement and is known as the "capture efficiency". For the material preferred as the packing in the present invention the value is 50. For glass fiber packings this value would typically be 150.) In many situations, and particularly in those situations in which water is present as the discontinuous phase, polyesters, including polycarbonates, are preferred as the packing material. Among the preferred polyesters, polyethylene terephthalate and polybutylene terephthalate are preferred with the latter being most preferred. Because of cost considerations and the pressure drop across the packing ($\Delta P$), these materials are preferably used in fiber form, although in some instances membranes may be used. The fibers may be used as woven mats but non-woven mats are generally preferred. It has been found that materials with the above described critical wetting surface tensions, and particularly polyesters, are much less readily disarmed than conventional materials and their use results in extended lifetimes for the coalescing elements. In addition, such materials are effective in separating liquids having very low IFTs, typically at or below 20 dynes/cm and preferably below 10 dynes/cm.

As the preferred fibrous mats used as the packing in the coalescing elements of the present invention, mats containing uniform fiber diameters as well as mats having stepped or graded fiber diameters across the depth of the mat (i.e., from one surface to the opposite parallel surface) may be used. Preferred are non-woven mats containing at least a partially graded fiber diameter structure and most preferred are mats arranged in cylindrical fiber structures having a graded fiber diameter structure in at least a portion of the structure in the radial direction. It is also preferred that such a structure have a substantially constant voids volume over at least a substantial portion of the structure, also, as mentioned above, in the radial direction. One of the preferred embodiments includes constant fiber diameters in the downstream portion with the upstream portion being profiled from the fiber diameter of the downstream portion up to a larger diameter. The fibers employed to make such mats are preferably substantially free of fiber-to-fiber bonding but are secured to one another by mechanical entanglement or intertwining. The fibers employed to make the non-woven mats are preferably synthetic, polymeric microfibers, most preferably thermoplastic in nature. Examples of such thermoplastic microfibers include polyolefins, polyamides and polyesters. Such a packing material and cylindrical structures provided with such materials are available from Pall Corporation and are described in U.S. Pat. Nos. 4,594,202 and 4,726,901, specifically incorporated herein. Typically, the voids volumes of such materials are in the range of from about 60–95%, most preferably from about 75 to about 85%. They also typically have annular thicknesses from about 0.4 to about 1 inch (1.0–2.5 cm). The fiber diameter ranges from about $1.5\mu$ or less up to about $20\mu$ or more. When the product is prepared to obtain a voids volume in the range of about 75 to about 85%, the fiber diameters are preferably selected to be below about $20\mu$. The packing may also include a "final coalescing layer" of fine fibers having diameters no more than about $5\mu$ and preferably about $3\mu$ to about $5\mu$. These fine coalescing fibers are present in a downstream layer having a thickness of about 0.1 to about 0.5 inches (about 2.5 to about 12.7 mm).

Each coalescing element may be provided with an upstream or downstream support and/or drainage material. Since most cylindrical coalescer elements are employed in situations in which flow is in an inside-out direction, provisions are generally taken to protect the downstream surface of the packing from damage and undue compression induced by elevated pressures or turbulent flow conditions. Thus in order to retain structural integrity and allow free flow of liquid, a plastic (e.g. PVC coated glass) or stainless steel is disposed or wound around the packing. Downstream of the packing, a needled felt or air laid fiber batting, preferably formed from polyester, may be placed. This element, which has very large pores, i.e., significantly larger than those of the packing, is provided to reduce turbulence and to orient or "straighten" fluid flow. Optionally, a "sock" or outer sleeve formed from Remay, Orlon or cotton may be located downstream of the turbulence-reducing layer to prevent fiber migration from the latter layer. In addition, an upstream filter material may be provided to capture particulate material before it contacts the packing of the coalescing element. Preferably, this is a depth filter having effective pore sizes significantly larger than the packing material of the coalescer so as not to inhibit flow into the coalescer. In a preferred embodiment, such as that discussed above, the packing used in the coalescing element may be of a profile type having graded pores which taper from the upstream surface to the downstream surface. This type of structure functions to trap dirt or particulate material in the larger pores and to perform a coalescing function in the downstream narrower pores. All of these cylindrically configured layers are enclosed within end caps.

The end cap, core and any support elements may be manufactured from materials which are inert to the liquid being treated. Typically, these will be formed from fiberglass, a metal such as stainless steel or, preferably, plastic.

The separator may include elements similar to those of the coalescing elements, such as end caps, core and, to a lesser extent, support and drainage layers. These also may be formed from the same materials used to form like elements in the coalescing elements. The separator may be formed as or include a porous packing or coated element which allows free flow of the continuous phase liquid but repels the liquid which originally formed the discontinuous phase. Preferably, this is a stainless steel screen, for example a $100 \times 100$ wire mesh screen, coated with PTFE. Most preferably, the functional portion of the separating element is formed from the medium described above, a calendared web of PTFE fibers and FEP binder. The separating element may be provided with a downstream metal or plastic core. Any plastic which is inert or highly resistant to the liquids being treated and any additives or contaminants found in the liquids, and which has satisfactory strength and rigidity may be used to form the core. Exemplary are polyesters, including polycarbonates such as Lexan, polyamides and Delrin. As with the coalescing elements, separating elements may be provided with an open pore sleeve to assist fluid flow distribution along the height dimension of the unit intermediate the discontinuous phase barrier or repelling layer and the core. Preferred is a pleated material known as Epocel ® (available from Pall Corporation) which is formed from cellulose and a phenolic binder. A preferred embodiment of the present invention employs, proceeding in an upstream-to-downstream direction, a sleeve of a calendared medium formed from PTFE fibers and a FEP binder (as described above), a polymeric or metal mesh support sleeve and a metal support core.

In the present invention, the critical surface energy or CWST of the functional part of the separator packing or coating is lower than the surface tension of the discontinuous phase. Thus, in situations in which water is present, the present invention is primarily effective to remove water in a discontinuous phase from another liquid having a surface tension lower than that of water. Generally, where water is in the continuous phase and the liquid to be removed constitutes the discontinuous or suspended phase and has a surface tension lower than that of water, a separator having a packing or coating with a surface energy below the surface tension of water would be ineffective since it would prevent passage of the water but might permit flow of the liquid in the discontinuous phase through the walls of the separator without improving the coalescence thereof. To employ a coating having a surface energy higher than the surface tension of water would allow both the continuous and discontinuous phase liquids to pass through the separator, also proving ineffective.

The following example indicates the manner in which the present invention is used. The invention should not however be construed as being in any way limited thereto.

EXAMPLE

A coalescer-separator system of the present invention was tested for removal of water from gasoline. An apparatus was constructed as described above. A housing containing a single coalescing element superposed in a coaxial arrangement over a single separating element. The ratio of effective surface area of the coalescing element to the separating element was about 3 to 1. The packing which defined the walls of the coalescing element was formed from a profiled polybutylene terephthalate fiber mat in which about the upstream 0.10 inch was formed from coarse fibers (about 40 to 60μ) and the downstream remaining portion of the mat was formed from fine fibers (about 3 to about 5μ) having an effective pore size of about 3μ and a voids volume of about 75%. The coalescer element was provided with end caps formed from stainless steel and an 1.815" internal diameter stainless steel core. A support cage formed from a fiberglass mesh coated with polyvinyl chloride and secured with a nylon hot melt bead which was located downstream of the element and upstream of an air laid polyester bat. The separating elements contained a discontinuous phase liquid barrier of Teflon coated on a 100×100 stainless steel mesh. The separator included the same end caps and core as the coalescer. A corrugated Epocel ® pack provided downstream of the separator's Teflon coating.

The coalescer-separator housing was connected to a 500 gallon gasoline storage tank by means of a closed loop system provided with valves (globe and conventional), flow controllers (Kates) and fluid pumps to control the pressure and flowrate of liquid in the system as well as to create a fuel and water emulsion. The system was also provided with an Aqua Glo device (available from Gammon Technical Products Company) to determine the concentration of water in the system.

The gasoline employed in the tests contained a commercial additive mixture which included, among other things, a surfactant or engine detergent. The additive composition was blended with a high test gasoline in three times the typical concentration of a commercially available gasoline to create an extreme disarming process stream.

After initiating the flow of gasoline in the system and bleeding air from a vent in the housing, the flowrate of fuel through the system was set at 5 gallons per minute. Water was then introduced to the system and adjusted by means of a rotameter. After reaching equilibrium (as determined by a constant ΔP), and water began to collect, downstream water concentrations were determined with the Aqua-Glo. The upstream concentration of the water was then readjusted at approximately 10 minute intervals and the procedure was repeated. The concentration of water was increased from 2–7% (vol/vol) to the values indicated and with the results shown in Table 2, below. Upstream and downstream fuel samples were removed for Clear and Bright analysis.

TABLE 2

| Time (minutes) | Water Injection % (vol/vol) | Aqua-Glo (ppm water) |
| --- | --- | --- |
| At equilibrium | 2 | 5 |
| 15 | 3 | 5 |
| 25 | 4 | 8 |
| 35 | 5 | 8.5 |
| 45 | 6 | 12 |
| 55 | 7 | 18 |
| 60 | 7 | 16 |
| 65 | 7 | 19 |

What is claimed is:

1. A liquid purification system capable of separating a first liquid from a second liquid, in which the first liquid is wholly or partly immiscible in and forms a discontinuous phase with a second, continuous phase-forming liquid comprising:
   (a) a housing;
   (b) a liquid inlet in said housing;
   (c) a first liquid outlet in said housing;
   (d) a second liquid outlet in said housing;
   (e) at least one coalescing assembly for coalescing said first liquid having at least one fluid inlet at the top thereof; and
   (f) at least one separating assembly for separating droplets of said first liquid from said second liquid, said at least one coalescing assembly being arranged in superposed relationship over said at least one separating assembly in said housing.

2. A liquid purification system according to claim 1 wherein said at least one coalescing assembly includes at least one coalescing element and said at least one separating assembly includes at least one separating element.

3. A liquid purification system according to claim 1 comprising at least one coalescing element in said at least one coalescing assembly and having a functional portion and at least one separating element in said at least one separating assembly and having a functional portion, said at least one coalescing element being arranged coaxially with respect to said separating element and having a packing material formed from polybutylene terephthalate in which the ratio of its effective surface area to that of the functional portion of said at least one separating element is in the range of about 0.25:1 to about 10:1.

4. A liquid purification system according to claim 3 wherein said at least one coalescing element has a fluid inlet at the top thereof.

5. A liquid purification system according to claim 1 wherein said at least one coalescing assembly includes at least one coalescing element having a functional portion and said at least one separating assembly includes at least one separating element having a functional portion, the ratio of the effective surface area of the functional portion of each of said at least one coalescing assembly to the effective surface area of the functional portion of each of said at least one separating assembly being in the range of about 0.25:1 to about 10:1.

6. A liquid purification system according to claim 5 wherein said ratio is about 5:1 to about 10:1.

7. A liquid purification system according to claim 5 wherein said ratio is about 0.25:1 to about 4:1.

8. A liquid purification system according to claim 5 wherein said at least one coalescing element has a fluid inlet at the top thereof.

9. A liquid purification system according to claim 2 wherein each of said at least one coalescing element is arranged coaxially with respect to each of said at least one separating element.

10. A liquid purification system according to claim 2 wherein said at least one coalescing assembly comprises a plurality of coalescing elements, each of which is arranged within said at least one coalescing assembly in parallel relationship.

11. A liquid purification system according to claim 2 wherein said at least one coalescing assembly comprises a plurality of coalescing elements, each of which is arranged within said at least one coalescing assembly in series relationship.

12. A liquid purification system according to claim 2 wherein said at least one coalescing assembly comprises one coalescing element and said at least one separating assembly comprises one separating element.

13. A liquid purification system according to claim 2 wherein said at least one coalescing assembly comprises a plurality of coalescing elements.

14. A liquid purification system according to claim 9 wherein said at least one coalescing element has a fluid inlet at the top thereof.

15. A liquid purification system according to claim 2 wherein said at least one coalescing element includes a packing material having a critical wetting surface tension intermediate the surface tensions of said first and second liquids.

16. A liquid purification system according to claim 15 wherein said packing material comprises a polyester.

17. A liquid purification system according to claim 15 wherein said packing material comprises polybutylene terephthalate.

18. A liquid purification system according to claim 2 wherein said at least one separating element includes a calendared, porous, fibrous structure which comprises polytetrafluoroethylene fibers and a fluorocarbon binder.

19. A liquid purification system according to claim 18 wherein said fibers have diameters up to about 70 micrometers.

20. A liquid purification system according to claim 18 wherein said binder is a fluorinated ethylene propylene.

21. A liquid purification system capable of separating a first liquid from a second liquid in which the first liquid is wholly or partly immiscible in and forms a discontinuous phase with a second, continuous phase-forming liquid comprising
(a) a housing;
(b) a liquid inlet in said housing;
(c) a first liquid outlet in said housing;
(d) a second liquid outlet in said housing;
(e) a plurality of coalescing elements for coalescing said first liquid each having a fluid inlet at the top thereof; and
(f) a plurality of separating elements for separating droplets of said first liquid from said second liquid, said plurality of coalescing elements and said plurality of separating elements being arranged in superposed and alternating relationship in said housing with the uppermost coalescing element being disposed above the uppermost separating element.

22. A liquid purification system capable of separating a first liquid from a second liquid in which the first liquid is wholly or partly immiscible in and forms a discontinuous phase with a second, continuous phase-forming liquid comprising
at least one coalescing assembly for coalescing said first liquid having at least one fluid inlet at the top thereof; and
at least one separating assembly for separating droplets of said first liquid from said second liquid, said at least one coalescing assembly being arranged in superposed and fluid communicable relationship above said at least one separating assembly.

* * * * *